United States Patent

[11] 3,575,260

| [72] | Inventors | George R. Urguhart<br>El Cajon;<br>Remo Tontini, San Diego, Calif. |
|---|---|---|
| [21] | Appl. No. | 835,281 |
| [22] | Filed | May 15, 1969 |
| [45] | Patented | Apr. 20, 1971 |
| [73] | Assignee | Rohr Corporation<br>Chula Vista, Calif. |

[54] METHOD AND APPARATUS FOR AUGMENTING THE THRUST OF A JET-PROPELLED AIRCRAFT AND SUPPRESSING THE NOISE THEREOF
11 Claims, 5 Drawing Figs.

[52] U.S. Cl. ............................................. 181/51,
239/127.3, 239/265.13, 239/265.17, 239/265.33
[51] Int. Cl. ........................................................ F01n 1/14,
F01n 1/16, B64d 33/06
[50] Field of Search............................................ 181/33, 43,
51, 33.22, 33.221, 33.222; 239/127.3, 265.13,
265.17, 265.19, 265.33

[56] References Cited
UNITED STATES PATENTS

| 2,487,588 | 11/1949 | Price............................ | 239/265.23 |
| 3,027,710 | 4/1962 | Maytner....................... | 239/127.3 |
| 3,067,968 | 12/1962 | Heppenstall................... | 181/33(.221) |
| 3,095,696 | 7/1963 | Rumble........................ | 181/33(.221) |
| 3,244,255 | 4/1966 | Possell......................... | 239/127.3X |
| 3,437,173 | 4/1969 | Ehrich......................... | 181/33(.22) |

FOREIGN PATENTS

| 997,262 | 9/1951 | France......................... | 181/33(.221) |
| 1,436,412 | 3/1966 | France......................... | 181/33(.221) |
| 1,019,857 | 2/1966 | Great Britain................. | 239/265(.33) |

*Primary Examiner*—Robert S. Ward, Jr.
*Attorney*—George E. Pearson

ABSTRACT: A tubular ejector is mounted on the nacelle of a jet-propelled aircraft so that it can be stowed alongside the nacelle or positioned downstream therefrom. A pair of hemicylindrical panels are mounted on the lower portion of the outer side of the ejector for movement between a stowed position alongside the ejector and a deployed position wherein one of the panels projects from the aft end of the ejector and the other panel projects from the aft end of said one panel. The jet stream flowing through the ejector is prevented from detaching from the inner surface thereof by admitting a portion of the boundary layer of said jet stream into holes which terminate within an area encircling the aft portion of said inner surface and which communicate with the forward portion of the ejector throat.

PATENTED APR 20 1971 3,575,260

INVENTOR.
GEORGE R. URQUHART
REMO TONTINI
BY Edwin D. Grant
ATTORNEY

3,575,260

METHOD AND APPARATUS FOR AUGMENTING THE THRUST OF A JET-PROPELLED AIRCRAFT AND SUPPRESSING THE NOISE THEREOF

SUMMARY OF THE INVENTION

This invention relates to jet-propelled aircraft and more particularly to apparatus for both augmenting the thrust of an aircraft jet propulsion unit and suppressing the noise thereof.

In accordance with this invention one or more panels of hemicylindrical form are deployable aft of a tubular ejector when the latter is itself positioned downstream from the engine nacelle of a jet-propelled aircraft to thereby augment the thrust of the jet stream issuing from the nacelle. In their deployed position the aforesaid panels effectively reduce the perceived noise level at positions under or at the sides of the panels. Furthermore, the design of the ejector and panels is such that optimum thrust augmentation is achieved while the noise of the propulsion assembly is being suppressed.

In one embodiment of this invention a tubular ejector is suspended from and movable along a pylon extending rearwardly from an aircraft jet-engine nacelle. A pair of rails are mounted on the outer surface of the ejector on opposite sides thereof and are disposed parallel with the longitudinal axis of said ejector. A first hemicylindrical panel is attached to these rails so that it can be either positioned around the lower portion of the ejector or moved rearwardly to dispose the greater portion thereof around the lower portion of the stream of thrust gas and atmospheric air issuing from the aft end of the ejector when the latter is positioned downstream from the nacelle. Another pair of rails are mounted on the outer side of the first panel on opposite sides thereof and are also disposed parallel with the longitudinal axis of the ejector. A second hemicylindrical panel is attached to the last-mentioned rails so that it be either positioned around the lower portion of the first panel or moved rearwardly to dispose the greater portion thereof around the lower portion of the aforesaid stream of thrust gas and air. Means are provided to move both panels between the described forward and aft positions thereof. The wall of the ejector is formed with an internal chamber which encircles the throat of the ejector and which extends from a point adjacent the forward edge of the ejector to a point adjacent its aft edge. A first set of holes are formed in the inner surface of the ejector adjacent the forward edge thereof and communicate with the forward portion of the aforesaid chamber, and a second set of holes are formed in said inner surface adjacent the aft edge of the ejector and communicate with the aft portion of said chamber. The holes in each set are disposed in a zone which extends circumferentially about the throat of the ejector, said throat being constricted between the two sets of holes. A portion of the jet stream and atmospheric air which enter the ejector when it is deployed enters the holes at the aft end of said ejector and flows through the chamber in the wall of the ejector and out of the holes at the forward end thereof into the throat of the ejector. This arrangement of the ejector eliminates the detachment of the jet stream (and atmospheric air intermixed therewith) from the inner surface of the ejector at the aft end of the latter, and thus the jet stream impinges upon the inner surface of the panel immediately aft of the ejector when both the latter and the panel are deployed.

OBJECTS OF THE INVENTION

It is accordingly a broad object of this invention to suppress the noise of an aircraft jet-propulsion unit without adversely affecting the operating efficiency thereof.

Another object of the invention is to provide effective apparatus for both augmenting the thrust of an aircraft jet engine and suppressing the noise thereof.

An additional object is to provide thrust-augmenting and sound-suppressing apparatus for a jet-propelled aircraft, which apparatus can be positioned in a streamlined configuration around the aft portion of an engine nacelle of the aircraft when thrust augmentation and sound suppression are not required.

DESCRIPTION OF THE DRAWINGS

In the drawings.

Throughout the drawings and the following specification, the same numbers designate the same parts.

DETAILED DESCRIPTION

Figure 3:
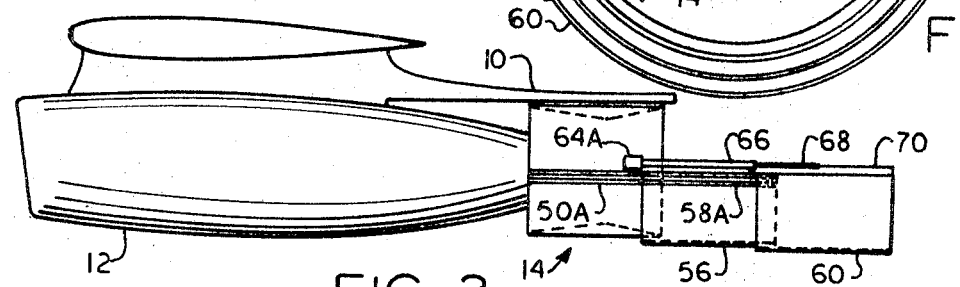
FIG. 3 is a side elevation of the same embodiment, illustrating the aforesaid ejector and panels in the deployed positions thereof.
Figure 1:
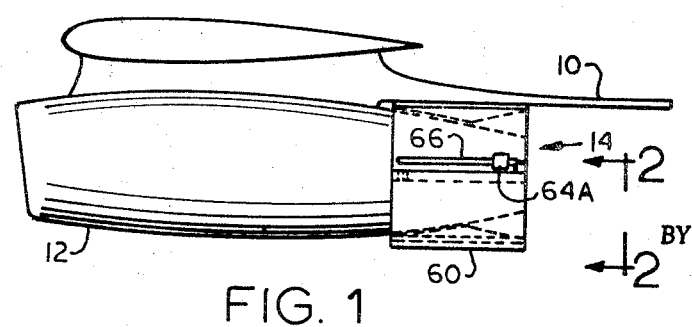
FIG. 1 is a side elevation of an exemplary embodiment of this invention, illustrating the stowed configuration of an ejector suspended from a pylon on an aircraft engine nacelle and of sound-suppressing panels mounted on said ejector.

As illustrated in FIGS. 1 and 3, one embodiment of this invention comprises a hollow pylon 10 one end of which is fixedly attached to a nacelle 12 containing an aircraft jet engine. The longitudinal axis of pylon 10 is parallel with the longitudinal axis of the thrust nozzle of the jet engine, which nozzle is substantially coterminous with the aft end of nacelle 12. Suspended from pylon 10 is a tubular ejector generally designated by the number 14. More specifically, a support member 16 (see FIGS. 4 and 5) is fixedly joined to the upper portion of the outer surface of ejector 14 and extends between the ends thereof, this member having a flat upper surface from which four arms 18 project. These arms are respectively disposed in pairs adjacent the forward and aft ends of support member 16 and, as can be seen in FIG. 5, each arm is spaced a short distance from a respective one of the longitudinally extending upper edges of said support member. Each arm 18 carries a roller 20 which engages the upper surface of a respective one of two flanges 22A, 22B which extend longitudinally of pylon 10 and which project inwardly from the lower edges of the sides thereof. The portions of the upper surface of member 18 disposed adjacent the longitudinal edges thereof slidably engage the lower surfaces of flanges 22A, 22B, respectively, and the sides of arms 18 slidably engage the end surfaces of said flanges, thus permitting movement of ejector 14 along pylon 10 while maintaining it in coaxial relation with the aforementioned thrust nozzle.

A motor 24 is fixedly positioned within the interior of pylon 10 at the forward end thereof. Mounted on the drive shaft 26 of this motor is a sprocket 28. Another sprocket 30 is rotatably mounted on a support arm 32 fixedly located within the interior of pylon 10 adjacent the aft end thereof, and a continuous drive chain 34 is engaged with the two sprockets and fixedly attached to a lug 36 which is integrally joined to the upper surface of support member 16 at the middle of ejector 14.

Figure 4:
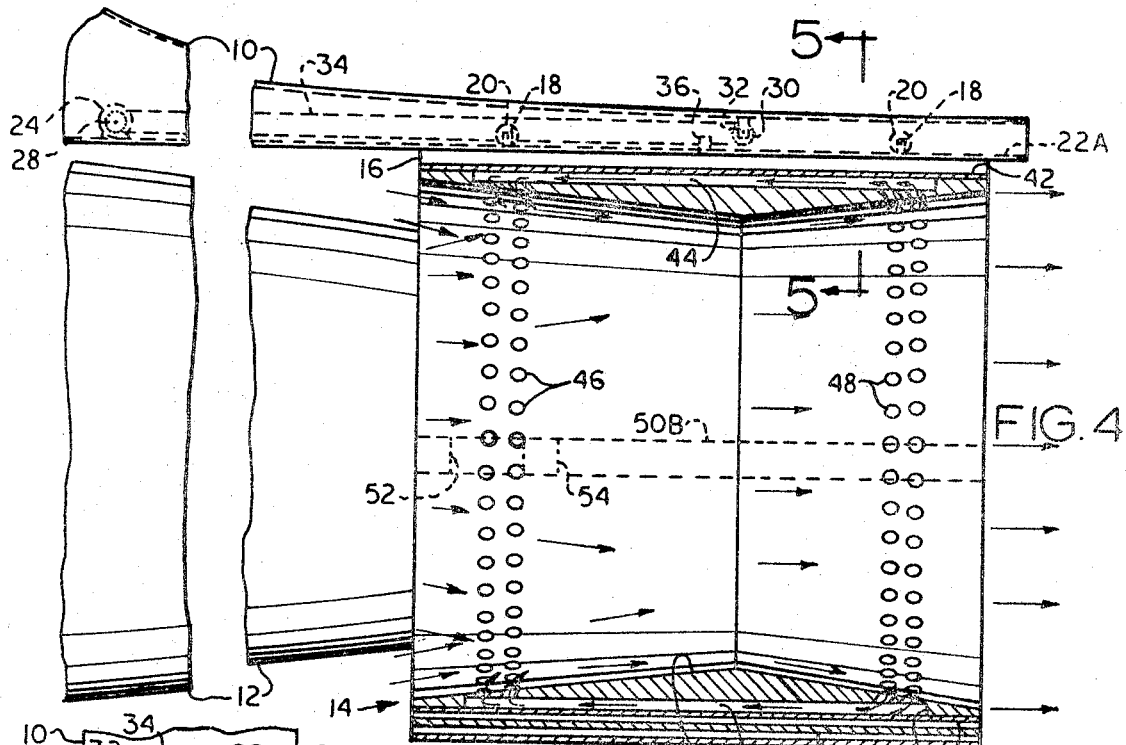
FIG. 4 is an enlarged side elevation of the same embodiment, the ejector being illustrated in longitudinal section and in a deployed position and the panels also being illustrated in longitudinal section but in a stowed position on the ejector.
Figure 5:
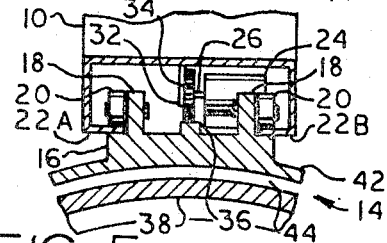
FIG. 5 is a cross-sectional, fragmentary detail view of components of the same embodiment, taken along the plane represented by line 5-5 in FIG. 4 and in the direction indicated in the latter drawing.

As can be seen in FIG. 4, the wall of ejector 14 comprises a ring 38 the inner surface of which first converges in the downstream direction and then diverges so that the throat of the ejector is constricted between the ends thereof. Extending around the periphery of ring 38 is a recess 40 the forward and aft edges of which are respectively parallel with and located near the forward and aft edges of the ring. The wall of ejector 14 also comprises a sleeve 42 the inner surface of which abuts the outer surface of ring 38 and is fixedly positioned thereon in coterminous relation with the forward and aft edges thereof. Sleeve 42 is thus spaced from the bottom of the recess 40 in ring 38 and cooperates with the latter to provide an annular internal chamber 44 in the wall of the ejector. A first set of holes 46 extend through ring 38 at the forward end of chamber 44, and a second set of holes 48 extend through the ring at the aft end of the chamber. More explicitly, the holes in each set are arranged in two rows which extend around the inner surface of ejector 14, and the holes are evenly spaced-apart in said rows with their longitudinal axes inclined toward the forward end of the ejector (i.e., the end of each hole 46, 48 which is at the inner surface of ring 38 is downstream from the end of the same hole which is at the bottom surface of the recess 40 in said ring).

It will be apparent that the number and diameter of the holes 46, 48 in the inner surface of ejector 14 may be different from what is illustrated in FIG. 4. Furthermore, the holes 46 at the forward end of the ejector may be replaced by an annular opening which extends from the inner surface of the ejector to the forward end of the chamber 44. The aforesaid chamber may also communicate with the channel of the ejector through porous panels which form part of the ejector wall at the forward and aft ends of said chamber. In some embodiments of the invention a multiplicity of narrow slots may be substituted for holes 46, 48 having a circular cross section.

Figure 2:
FIG. 2 is a fragmentary end elevation of components of the apparatus illustrated in FIG. 1, taken along the plane represented by line 2-2 in the latter drawing and in the direction indicated therein.

A pair of rails 50A, 50B (see FIG. 2) are fixedly mounted on the outer surface of sleeve 42 of ejector 14 on opposite sides of the latter, the longitudinal axis of these rails being parallel with the longitudinal axis of said sleeve and the upper edges of the rails and said longitudinal axis of said sleeve lying in the same plane. Rails 50A, 50B are coextensive with the ejector and each has a longitudinally extending groove formed in the outer side thereof, which groove is dovetail-shaped in cross section. In FIG. 4 broken lines illustrate a pair of mounting blocks 52, 54 one side of each of which is formed with a dovetail-shaped projection adapted to matingly fit within the groove in the outer side of rail 50B. Another pair of identically constructed mounting blocks are likewise engaged with rail 50A. Preferably roller bearings are suitably mounted in recesses in the aforesaid grooves in rails 50A, 50B, and the surfaces of the dovetail projections of blocks 52, 54 attached to the rails abut these bearings rather than the surfaces of the grooves. Illustrated in FIGS. 2 and 3 is a first hemicylindrical panel 56 (i.e., shaped like a trough with open ends) which is attached at its inner surface and adjacent its longitudinal edges to the blocks 52, 54 on each rail 50A, 50B. More specifically, each of the blocks 52 is mounted so that its forward edge is even with the forward edge of ejector 14, and each of the blocks 54 is spaced a short distance from said forward edge as illustrated in FIG. 4. Since the blocks can be moved along their respective supporting rails 50A, 50B, first panel 56 can be positioned alongside the lower portion of ejector 14 with its forward and aft edges respectively even with the forward and aft edges of the ejector, or the panel can be moved to the position illustrated in FIG. 3, wherein the greater portion thereof projects from the aft end of said ejector. Suitable stop means (not illustrated) are operatively connected to rails 50A, 50B and panel 56 to retain the latter on the former.

A pair of rails 58A, 58B (see FIG. 2) are fixedly secured to the outer surface of first panel on opposite sides thereof, the longitudinal axes of these rails being parallel with the longitudinal axis of the ejector 14 and the upper edge of each rail being even with the adjacent upper edge of the panel. Rails 58A, 58B are coextensive with first panel 46 and each has a longitudinally extending groove formed in the outer side thereof, which groove is dovetail-shaped in cross section. Attached to the inner surface of a second hemicylindrical panel 60 at the forward end thereof are four mounting blocks 62 (see FIG. 2, wherein the rearmost block on each side of panel 60 is illustrated) which are identical in construction to mounting blocks 52, 54 on first panel 56 and pairs of which are engaged with a respective one of the rails 58A, 58B in the same way said blocks 52, 54 are engaged with rails 50A, 50B. Thus second panel 60 can either be positioned alongside first panel 56 and ejector 14 as illustrated in FIG. 1 or moved to a position wherein the greater portion thereof projects from the aft end of said first panel as illustrated in FIG. 3. Suitable stop means (not illustrated) are operatively connected to rails 58A, 58B and panel 60 to retain the latter on the former.

Illustrated in fig. 2 are a pair of actuators 64A, 64B which are fixedly mounted on the outer surface of ejector 14 adjacent the aft end thereof and each of which is adapted to move three telescoped shafts 66, 68, 70 (see FIGS. 1 and 3 also) longitudinally of said ejector, each shaft 66 being slidably mounted in an aperture in the associated drive motor. Various known mechanisms may be employed in actuators 64A, 64B to move the shafts as aforesaid, such as suitable gear or hydraulic arrangements. Pumps, electric motors or other power sources associated with the actuators are operated by power lines which are extended from the forward portion of pylon 10 as ejector 14 moves rearwardly thereon, and which are retracted by suitable means, such as a rotatable reel, when the ejector is returned to its stowed position around the aft portion of nacelle 12. The rear end of each shaft 66 is provided with a laterally extending arm 72 (see FIG. 2) which is connected to a respective one of the longitudinal edges of first panel 56 at the aft end thereof, and the rear end of each shaft 70 is likewise provided with a laterally extending arm 74 which is connected to a respective one of the longitudinal edges of second panel 60 at the aft end thereof.

OPERATION

During cruise flight of an aircraft provided with the above-described thrust-augmenting and sound-suppressing apparatus, the two panels 56 and 60 are positioned alongside ejector 14 and the latter is located at the forward end of pylon 10 and disposed around the aft end of nacelle 12, as illustrated in FIG. 1. When thrust augmentation and sound suppression are required, motor 24 is operated to rotate sprocket 28 in a counterclockwise direction as it is viewed in FIG. 2, whereupon drive chain 34 pulls ejector 14 to its deployed position downstream from nacelle 12. Motors 64A and 64B are also operated to extend shafts 66, 68, 70 rearwardly from the ejector and thereby deploy panels 56 and 60 as illustrated in FIG. 2. Suitable limit switches are provided to stop the drive motors when the ejector and panels 56, 60 are deployed.

After ejector 14 has been deployed the thrust of the jet stream issuing from nacelle 12 is augmented by the flow of atmospheric air into the ejector. However, if holes 46 and 48 and chamber 44 where not provided in the wall of ejector 14, the stream of atmospheric air and exhaust gas passing through the ejector would separate from the inner surface of the latter at the point where holes 48 are located. Such flow separation in a conventional tubular ejector results from the low pressure at the aft end thereof, which permits atmospheric air to enter the aft end of the ejector and flow along its wall in the direction opposite the flow of the main stream of atmospheric air and exhaust gas. In the ejector 14 which has been described and illustrated a portion of the stream of atmospheric air and exhaust gas flowing through the throat thereof enters the holes 48 at the aft end of said throat and flows in a forward direction through chamber 44 and out of the holes 46 at the forward end of said chamber. This flow of air and gas (illustrated by arrows in FIG. 4) through holes 48 causes the expansion boundary of the stream flowing through ejector 14 to remain attached to the inner surface of the ejector aft of said holes, and is effected by the pressure gradient along the inner surface of the ejector, the pressure being greater at holes 48 than it is at holes 46. Since the boundary of the stream of atmospheric air and exhaust gas remains attached to the aft portion of the inner surface of ejector, the thrust produced by the propulsion unit is greater than that of the same assembly equipped with a conventional ejector of the same size as ejector 14. Furthermore, the stream of atmospheric air and exhaust gas impinges upon panel 56 immediately aft of the ejector. It has been found that with this arrangement of ejector 14 and panels 56 and 60 the perceived noise level at positions under or at the sides of an aircraft provided with said components is effectively reduced, with minimal effect on the operation of the aircraft. Obviously motors 24, 64A and 64B can be operated to return ejector 14 and panels 56 and 60 to their stowed positions when thrust augmentation and sound suppression are no longer required.

Although the invention has been described with reference to a particular embodiment of the same, it should not be considered to be limited thereto for various modifications could be made therein by one having ordinary skill in the art without departing from the spirit and scope of the invention as defined in the following claims.

We claim:

1. A method of suppressing the noise of a jet-propelled aircraft, which comprises surrounding the thrust gas discharged from an engine of said aircraft with an annular stream of atmospheric air in a tubular ejector, intercepting the expansion boundary of the combined stream of thrust gas and atmospheric air at a point aft of said ejector, admitting a portion of the boundary layer of said combined stream of thrust gas and atmospheric air into holes which terminate within an area encircling the aft portion of the inner surface of said ejector and which communicate with the forward portion of the ejector throat, and discharging said admitted portion of said stream into said ejector throat at the forward end thereof.

2. In combination with an aircraft having a jet engine enclosed in a nacelle, thrust-augmenting and sound-suppressing apparatus comprising a tubular ejector mounted on said aircraft for movement between a first position wherein said ejector is disposed around the aft portion of said nacelle and a second position wherein said ejector is positioned downstream from said nacelle and thrust gas discharged from said jet engine and atmospheric air pass therethrough, means on said aircraft for moving said ejector between said first and second positions thereof, a panel mounted on the lower portion of the outer side of said ejector for movement between a first position wherein said panel is positioned alongside said ejector and a second position wherein at least a portion of said panel is positioned downstream from said ejector and between the earth's surface and the stream of thrust gas and atmospheric air issuing from said ejector, and means on said aircraft for moving said panel between said first and second positions thereof.

3. Apparatus as defined in claim 2 including a second hemicylindrical panel mounted on the outer side of the panel attached to said ejector and movable between a first position alongside the latter panel and a second position wherein at least a portion thereof is downstream from the latter panel and between the earth's surface and said stream of thrust gas and atmospheric air issuing from said ejector, and means on said aircraft for moving said second panel between said first and second positions thereof.

4. Apparatus as defined in claim 3 wherein each of said panels is substantially hemicylindrical.

5. Apparatus as defined in claim 2 wherein the inner surface of said ejector is perforate adjacent the aft end thereof, holes in said perforate portion of said inner surface being disposed circumferentially about the throat of the ejector and communicating with the forward portion of said throat through at least one internal, longitudinally extending passage in the ejector wall.

6. Apparatus as defined in claim 5 wherein said internal passage encircles the throat of said ejector.

7. Apparatus as defined in claim 6 wherein said internal passage communicates with the forward portion of the throat of said ejector through an opening encircling said throat.

8. Apparatus as defined in claim 7 wherein said opening is inclined so that its inner portion is forward of its outlet at the inner surface of the ejector.

9. Apparatus as defined in claim 6 wherein said internal passage communicates with the forward portion of the throat of said ejector through a plurality of holes extending through the ejector wall adjacent the forward end thereof and disposed circumferentially about said throat.

10. Apparatus as defined in claim 9 wherein said holes adjacent the forward end of said ejector are inclined relative to the longitudinal axis of said ejector so that their inner ends are forward of their outer ends.

11. Apparatus as defined in claim 6 wherein said internal passage communicates with the forward and aft portions of the throat of said ejector through porous sections of the ejector wall.